United States Patent
Thomas et al.

(10) Patent No.: US 11,808,294 B2
(45) Date of Patent: Nov. 7, 2023

(54) COATED FASTENER

(71) Applicant: Georgia-Pacific Gypsum LLC, Atlanta, GA (US)

(72) Inventors: Vincent B. Thomas, Bogart, GA (US); Jason G. Peace, Newnan, GA (US); Seth C. Glenn, Juliette, GA (US)

(73) Assignee: Georgia-Pacific Gypsum LLC, Atlanta, GA (US)

( * ) Notice: Subject to any disclaimer, the term of this patent is extended or adjusted under 35 U.S.C. 154(b) by 707 days.

(21) Appl. No.: 16/666,853

(22) Filed: Oct. 29, 2019

(65) Prior Publication Data
US 2020/0063780 A1   Feb. 27, 2020

Related U.S. Application Data

(62) Division of application No. 15/625,839, filed on Jun. 16, 2017, now Pat. No. 10,495,129.
(Continued)

(51) Int. Cl.
*F16B 33/00* (2006.01)
*F16B 33/06* (2006.01)
(Continued)

(52) U.S. Cl.
CPC .............. *F16B 33/004* (2013.01); *B32B 3/08* (2013.01); *B32B 5/022* (2013.01); *B32B 7/14* (2013.01);
(Continued)

(58) Field of Classification Search
CPC .... F16B 33/004; F16B 33/06; F16B 25/0031; F16B 43/001; F16B 33/00; F16B 11/006;
(Continued)

(56) References Cited

U.S. PATENT DOCUMENTS 2,140,749 A * 12/1938 Kaplan ................... F16B 15/02
470/34
2,666,354 A    1/1954 Jacob et al.
(Continued)

FOREIGN PATENT DOCUMENTS

CN        201651001 U    11/2010
CN        102196903 A    9/2011
(Continued)

OTHER PUBLICATIONS

International Search Report and Written Opinion, PCT/US2017/037828, 37 pages, dated Sep. 6, 2017.
(Continued)

*Primary Examiner* — Scott R. Walshon

(57) ABSTRACT

Self-sealing fasteners and associated building panels, systems, and methods are provided. In one aspect, a fastener includes an elongated fastener body with an external surface extending between the first end and the second end, and a coating material disposed on at least a portion the external surface. In another aspect, a fastener includes an elongated fastener body with an external surface extending between the first end and the second end, and a polymer annulus surrounding at least a portion of the external surface of the of the elongated fastener body at or adjacent the head of the fastener.

20 Claims, 9 Drawing Sheets

Related U.S. Application Data

(60) Provisional application No. 62/351,572, filed on Jun. 17, 2016.

(51) Int. Cl.

| | | |
|---|---|---|
| *E04B 1/62* | (2006.01) | |
| *E04C 2/04* | (2006.01) | |
| *E04B 2/74* | (2006.01) | |
| *B32B 5/02* | (2006.01) | |
| *B32B 13/14* | (2006.01) | |
| *B32B 13/02* | (2006.01) | |
| *B32B 13/08* | (2006.01) | |
| *B32B 3/08* | (2006.01) | |
| *B32B 7/14* | (2006.01) | |
| *F16B 25/00* | (2006.01) | |
| *F16B 43/00* | (2006.01) | |

(52) U.S. Cl.
CPC .............. *B32B 13/02* (2013.01); *B32B 13/08* (2013.01); *B32B 13/14* (2013.01); *E04B 1/625* (2013.01); *E04C 2/043* (2013.01); *F16B 25/0031* (2013.01); *F16B 33/06* (2013.01); *F16B 43/001* (2013.01); *B32B 2250/02* (2013.01); *B32B 2255/02* (2013.01); *B32B 2255/20* (2013.01); *B32B 2255/26* (2013.01); *B32B 2260/021* (2013.01); *B32B 2260/044* (2013.01); *B32B 2262/02* (2013.01); *B32B 2262/101* (2013.01); *B32B 2307/718* (2013.01); *B32B 2307/7242* (2013.01); *B32B 2307/7265* (2013.01); *B32B 2307/73* (2013.01); *B32B 2307/732* (2013.01); *B32B 2607/00* (2013.01); *E04B 2/7457* (2013.01)

(58) Field of Classification Search
CPC .... F16B 39/225; F16B 39/34; F16B 15/0092; Y10S 411/922; Y10S 411/914; Y10S 411/947
See application file for complete search history.

(56) References Cited

U.S. PATENT DOCUMENTS

| | | | |
|---|---|---|---|
| 3,568,746 A | | 3/1971 | Faroni et al. |
| 4,780,039 A | * | 10/1988 | Hartman ................ F16B 43/00 411/533 |
| 5,149,237 A | | 9/1992 | Gabriel et al. |
| 5,426,130 A | * | 6/1995 | Thurber .................... C09J 4/00 522/170 |
| 5,804,138 A | * | 9/1998 | Earlam ...................... C22B 9/10 148/26 |
| 6,427,796 B1 | * | 8/2002 | Tsutsumikoshi ........ F02B 75/16 180/227 |
| 6,584,735 B2 | | 7/2003 | Burton |
| 7,195,437 B2 | * | 3/2007 | Sakamoto ............... F16B 33/06 411/428 |
| 7,866,931 B2 | | 1/2011 | Murtha |
| 8,065,851 B2 | | 11/2011 | Scoville et al. |
| 8,398,350 B2 | * | 3/2013 | Ishida .................. F16B 33/008 411/371.1 |
| 9,346,244 B2 | | 5/2016 | Hauber et al. |
| 9,394,696 B2 | | 7/2016 | Norwood et al. |
| 10,179,997 B2 | | 1/2019 | Thomas |
| 10,344,470 B2 | | 7/2019 | Golding, Jr. et al. |
| 10,495,129 B2 | | 12/2019 | Thomas et al. |
| 10,697,177 B2 | | 6/2020 | Teng et al. |
| 2004/0170873 A1 | | 9/2004 | Smith |
| 2006/0002784 A1 | | 1/2006 | Curtis |
| 2007/0122253 A1 | | 5/2007 | Murtha |
| 2008/0019793 A1 | | 1/2008 | Rosenkranz |
| 2013/0243991 A1 | | 9/2013 | McGuire |
| 2013/0295286 A1 | | 11/2013 | Hauber et al. |
| 2014/0083035 A1 | | 3/2014 | Negri et al. |
| 2015/0107185 A1 | * | 4/2015 | Kose ..................... F16B 43/001 52/741.1 |
| 2018/0223530 A1 | | 8/2018 | Grant et al. |
| 2019/0352918 A1 | | 11/2019 | Norwood et al. |

FOREIGN PATENT DOCUMENTS

| | | | | |
|---|---|---|---|---|
| CN | 105473530 A | | 4/2016 | |
| EP | 480103 B1 | * | 12/1994 | .......... B05D 3/0426 |
| EP | 1300596 A1 | | 4/2003 | |
| WO | WO-2006104622 A2 | * | 10/2006 | .............. C08J 3/241 |
| WO | 2019161018 A1 | | 8/2019 | |

OTHER PUBLICATIONS

Extended European Search Report, European Application No. 17814151.1, dated Feb. 4, 2020.

CN office action received for Application No. 202010692312.9, dated Jul. 13, 2021, 26 pages (14 pages of English Translation and 12 pages of original document).

\* cited by examiner

COATED FASTENER

CROSS-REFERENCE TO RELATED APPLICATIONS

This application is a divisional of U.S. application Ser. No. 15/625,839, filed on Jun. 16, 2017, which claims priority benefit of U.S. Provisional Application No. 62/351,572, filed on Jun. 17, 2016, the disclosures of which are incorporated herein in their entirety.

FIELD

The present invention relates generally to the field of fasteners for use in building construction, and more particularly to self-sealing fasteners that provide water-resistant properties.

BACKGROUND

Typical building panels, or building sheathing, include a core material, such as gypsum, and a mat facer, such as a fiberglass mat facer. During manufacturing, the gypsum core material is traditionally applied as a slurry to a surface of the mat facer and allowed to set, such that the mat facer and gypsum core are adhered at the interface. Often, panels suffer from poor slurry infiltration at the mat facer, resulting in inadequate mat adhesion to the core material and decreased performance.

For example, poor slurry infiltration at the mat facer may lead to increased porosity of the panel, resulting in increased water penetration and decreased weathering performance. Thus, such panels typically do not meet building code requirements for air and water penetration. Indeed, many modern building codes require the use of barriers in construction to protect the building from air and water penetration. For example, building codes in eastern Canada and the northeastern United States now require air barriers to be used in all construction. Moreover, the existing International Building Code/International Residential Code (IBC/IRC) requires the use of a water resistive air barrier for all new construction. Common water-resistive air barriers are formed from a variety of materials and structures and applied to the surface of sheathing panels (e.g., gypsum panels, oriented strand board panels).

Traditionally, three types of water resistive air barriers may be used to meet building codes. First, fabric type membranes, or "wraps," may be used to cover the surface of building sheathing panels. However, these fabric wraps are typically unable to withstand wind conditions, suffer from drooping, and are difficult to install at heights. Moreover, the standard method of attaching such fabric membranes to sheathing panels is stapling, which compromises the effectiveness of the membrane as an air or water barrier. Second, a liquid coating water resistive air barrier membrane may be applied to sheathing panels. However, these liquid coatings must be applied in the field by qualified contractors, which is time intensive and costly. Moreover, although liquid coatings serve as effective an water barrier, they provide low water vapor permeance, which affects the wall's ability to dry should it get wet during service (e.g., around window penetrations, flashing). Third, self-adhered, or "peel and stick," water resistive air barrier membranes may be applied to sheathing panels. However, these self-adhered membranes are generally not permeable and therefore are not an option in many projects, because the architect or engineer must account for this impermeability in designing the building, to prevent the potential for moisture being trapped inside the wall cavity. Furthermore, self-adhered membranes require the sheathing panels to be dry and often primed prior to application, which significantly slows down the construction process.

Panels having enhanced mat-to-core adhesion and/or panel material penetration into the mat, which provide improved water-resistive and air barrier properties have been developed. However, when such panels having improved water-resistive and air barrier properties are used in building construction, sealant and/or tape is required to seal all joints, corners, openings, penetrations, material transitions, and fasteners. That is, a sealant or tape must be used to cover each fastener (e.g., nail, screw) that is used to secure the building panel onto the studs or frame. Applying this sealant or tape is labor intensive and time consuming, and improper application of the sealant or tape may lead to leaks at the fastener.

Thus, it would be desirable to provide fasteners and building panels having self-sealing properties, to eliminate the need for such sealants/tapes and to provide improved water-resistance properties at the interface of such fasteners and building panels.

BRIEF DESCRIPTION OF THE DRAWINGS

Referring now to the drawings, which are meant to be exemplary and not limiting, and wherein like elements are numbered alike. The detailed description is set forth with reference to the accompanying drawings illustrating examples of the disclosure, in which use of the same reference numerals indicates similar or identical items. Certain embodiments of the present disclosure may include elements, components, and/or configurations other than those illustrated in the drawings, and some of the elements, components, and/or configurations illustrated in the drawings may not be present in certain embodiments.

DETAILED DESCRIPTION

Figure 1:
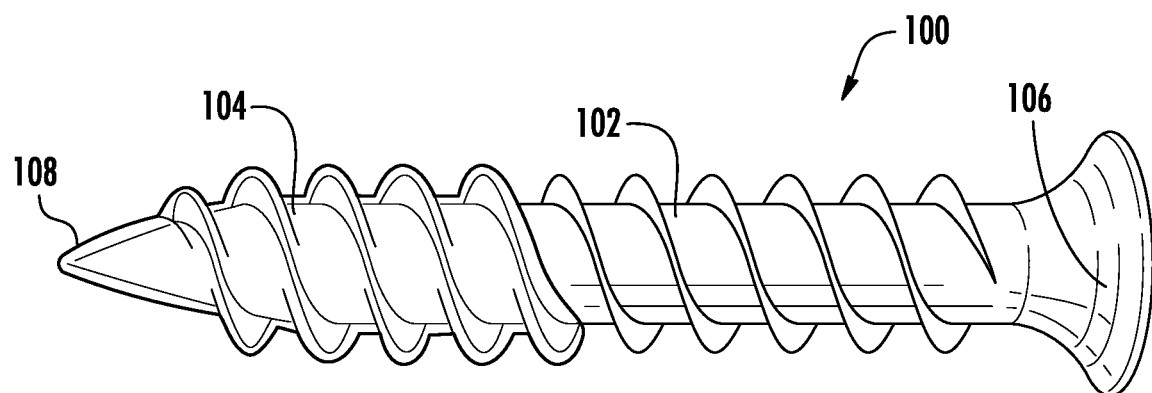
FIG. 1 is a perspective view of one embodiment of a self-sealing fastener, in accordance with the present disclosure.

Disclosed herein are fasteners and building panels having self-sealing properties, as well as methods of making and installing such fasteners and panels, and building systems including such fasteners and panels. As used herein, the term "self-sealing" refers to the fastener or panel forming a water-resistant seal in the absence of additional sealants. Advantageously, these fasteners and building panels eliminate the need to spot fasteners with a liquid sealant or other external sealing means and reduce the possibility of liquid penetrating into cladding systems (i.e., building systems) formed with these fasteners and building panels. Thus, these self-sealing fasteners and building panels allow for faster installation of building systems and material savings over traditional water and air barrier systems.

The self-sealing fasteners of the present disclosure can be used with lathing type applications, direct applied sheathing, or other applications in which the large number of fastener penetrations through the sheathing structure could present increased paths for water or air intrusion. For example, the self-sealing fasteners described herein may be used with any suitable building or construction panels, including, but not limited to, wood-based (e.g., plywood, oriented strand board) panels, gypsum panels, and isocyanurate board. In particular embodiments, the self-sealing fasteners described herein may be used with panels or systems having an integrated air and water barrier, such as oriented strand board or gypsum based sheathing panels having an integrated water-resistive air barrier. As used herein, the term "integrated water-resistive air barrier" refers to a panel that is manufactured to display both water-resistive barrier and air barrier properties, in the absence of commercially available water-resistive air barriers that are attached to traditional sheathing panels (e.g., mechanically attached flexible sheet, self-adhered sheets, fluid-applied membranes, spray foams). That is, the self-sealing fasteners of the present disclosure may be particularly suitable for use with panels having integrated water-resistive air barrier properties, to further reduce the energy and labor required to install a system of such panels.

For example, the building panels described herein may be gypsum sheathing panels having water-resistive air barrier properties, such as those described in U.S. application Ser. Nos. 15/014,793, 15/014,821, and 15/014,922, entitled "Gypsum Panels, Systems, and Methods," which are incorporated herein by reference in their entirety. These panels provide advantages over commercially available gypsum panels, such as enhanced mat-to-core adhesion and related properties, reduced porosity in the mat for reducing water penetration, and/or improved weathering performance. For example, by maximizing gypsum slurry penetration into the side of the fiberglass mat receiving gypsum of the gypsum core, the movement of water under the mat coating within the glass mat of the finished panel when exposed to bulk water head pressures may be substantially and adequately reduced, without significantly altering the water vapor transmission rate (i.e., the ability to dry) of the finished panel. Thus, the gypsum panels disclosed herein may have one or more improved water-resistive air barrier properties. As such, these panels and systems of multiple panels further provide advantages over commercially available water-resistive air barriers that are attached to traditional gypsum sheathing (e.g., mechanically attached flexible sheet, self-adhered sheets, fluid-applied membranes, spray foams), as well as over wood-based (e.g., oriented strand board) panels, which do not display the fire resistance properties of gypsum panels.

As used herein, the term "water-resistive barrier" refers to the ability of a panel or system to resist liquid bulk water from penetrating, leaking, or seeping past the sheathing and into the surrounding wall components while also providing a water vapor transmission rate, or permeance, that is high enough to allow any moisture that does develop in the wall to dry. Combined with flashing around openings, such water-resistive barriers may create a shingled effect to direct water away from the sheathing and surrounding wall components. As used herein, the term "air barrier" refers to the ability of a panel or system to resist the movement of air into (infiltration) and out of (exfiltration) conditioned spaces, to create a more energy efficient structure. As used herein, the term "water-resistive air barrier" refers to the ability of a panel or system to display both water-resistive barrier and air barrier properties.

Gypsum sheathing panels or boards may contain a set gypsum core sandwiched between two fibrous glass mats, one or both of which may be coated. The coating may be a continuous barrier coating. As used herein, the term "continuous barrier coating" refers to a coating material that is substantially uninterrupted over the surface of the fibrous mat. The continuous barrier coating may be any suitable coating material known to those of ordinary skill in the art. For example, the coating may include a polymer or resin based binder material along with one or more inorganic fillers. The continuous barrier coating may be applied on a surface of the fiberglass mat and penetrates some portion of the thickness thereof. For example, the coating may penetrate from about 5 percent to about 60 percent of the thickness of a typical fiberglass mat (e.g., about 0.05 mm to about 0.3 mm of a mat having a thickness of about 0.4 mm to about 1.0 mm). For example, a coating may penetrate from about 20 percent to about 50 percent of the thickness of a typical fiberglass mat (e.g., about 0.1 mm to about 0.25 mm of a mat having a thickness of about 0.5 mm to about 0.8 mm).

During manufacturing, a gypsum slurry may be deposited on the uncoated surface of the fiberglass mat and set to form a gypsum core of the panel. The gypsum slurry may penetrate some remaining fibrous portion of the thickness of the fiberglass mat (i.e., some portion of the fiberglass mat that is not already penetrated by the coating) and provide a mechanical bond for the panel. The gypsum slurry may be provided in one or more layers, having the same or different compositions, including one or more slate coat layers. As used herein, the term "slate coat" refers to a gypsum slurry having a higher wet density than the remainder of the gypsum slurry that forms the gypsum core.

Traditional gypsum sheathing panels do not consistently pass industry standard bulk water holdout tests and therefore are typically covered with commercially available water-resistive air barriers (e.g., mechanically attached flexible sheets, self-adhered sheets, fluid-applied membranes or coatings, sprayed foams). It has been determined that water leaks in these traditional sheathing panels are formed not only because the seams and openings are not treated, but also because water under pressure is able to penetrate though pin holes in the coating on the fiberglass mat surface and travel through the glass mat along small air pockets or channels underneath the coating and along the top of the set gypsum core. This phenomenon is especially noteworthy at or near the edges of the gypsum panel, where open pockets at the gypsum core-glass mat interface are more numerous and voluminous. These air pockets, if interconnected, allow water to travel under the glass mat coating, resulting in leaks under treated seams, openings, and fasteners.

Increasing the thickness of the coating material on the fiberglass mat has been found ineffective at providing the desired water-resistive air barrier, because the extra coating weight results in a greatly reduced water vapor transmission rate and less potential for drying wet walls in service. Higher coating weights reduce the ability of the gypsum panel to dry in the manufacturing process resulting in reduced line speeds and potential for blisters or blows of the coated mat overlay. To achieve higher coating weights suitable for bulk water hold-out, an offline coating process is needed which greatly enhances manufactured cost. As such, the gypsum panels and sheathing systems used in combination with the self-sealing fasteners described herein may be those in which such air pockets or voids are substantially eliminated, so that the panels display the desired water resistive barrier and air barrier properties independent of externally applied barrier products.

These sheathing panels may be combined with seaming components to treat the joints, or seams, between panels (i.e., the joints, corners, and material transitions other than the fasteners) to greatly reduce the cost, time, and complexity of installation of a water-resistive air barrier that provides the desired resistance to bulk water without affecting the water vapor transmission rate of the panel.

While this disclosure is generally described with reference to gypsum panels, it should be understood that other panel core materials are also intended to fall within the scope of the present disclosure. For example, cementitious panel core materials such as those including magnesium oxide or aluminosilicate may be substituted for the gypsum of the embodiments disclosed herein, to achieve similar results.

Various embodiments of this disclosure are for purposes of illustration only. Parameters of different steps, components, and features of the embodiments are described separately, but may be combined consistently with this description of claims, to enable other embodiments as well to be understood by those skilled in the art. Various terms used herein are likewise defined in the description, which follows.

Self-Sealing Fasteners

The fasteners disclosed herein may be any suitable fastener type, design, or size. In certain embodiments, a fastener has an elongated fastener body with a first end (e.g., head) and an opposed second end, with an external surface extending between the first end and the second end. For example, the external surface or some portion thereof may include threads, such as fine threads or coarse threads. For example, the fasteners may be screws, bolts, rivets, nails, pins, knurled pins or other fasteners known in the art. In certain embodiments, the fastener is a screw, such as a bugle head screw, a wafer head screw, a drill point screw, a sharp point screw, or a self-tapping screw. In certain embodiments, the fasteners have a length of from about 1 inch to about 1⅝ inch, such as 1¼ inch.

Figure 2:
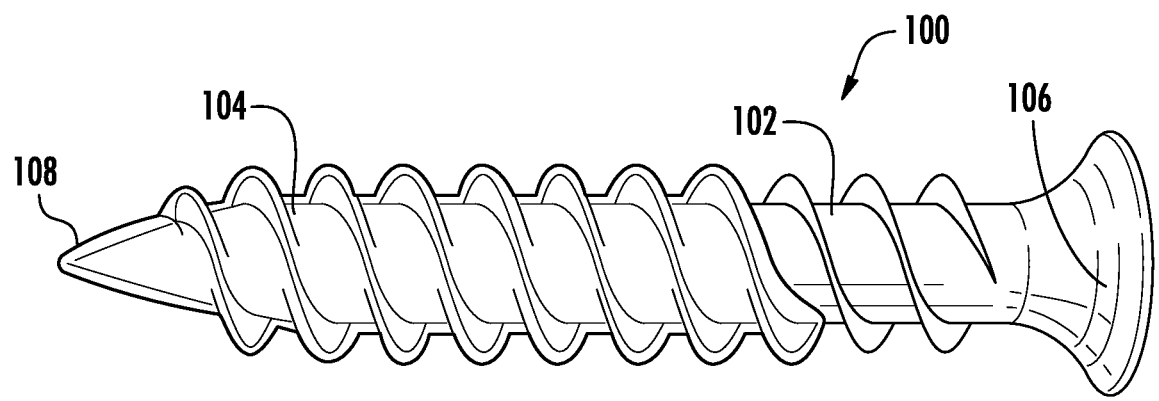
FIG. 2 is a perspective view of one embodiment of a self-sealing fastener, in accordance with the present disclosure.

In one aspect, as shown in FIGS. 1 and 2, a self-sealing fastener 100 includes an elongated fastener body 102 having a first end 106 and an opposed second end 108, with an external surface extending between the first end 106 and the second end 108. A coating material 104 is disposed on at least a portion the external surface of the elongated fastener body. The coating material may be any suitable material having a low viscosity at high shear rates, such that when the fastener is driven into a surface by traditional means imparting high shear to the fastener (e.g., a screw gun, which operates at high revolutions, such as approximately 4000 rpm), the coating material flows to coat the fastener body up to the countersink.

For example, the coating material may display a viscosity of less than 1 Pa·s, measured at a shear rate of 1000 Hz and at a temperature of 150° F. In some embodiments, the coating material displays a viscosity of less than $1 \times 10^{-3}$ Pa·s, measured at a shear rate of 1000 Hz and at a temperature of 150° F. In some embodiments, the coating material displays a viscosity of less than $2 \times 10^{-5}$ Pa·s, measured at a shear rate of 1000 Hz and at a temperature of 150° F. In some embodiments, the coating material may display a viscosity of from about 1 Pa·s to about $1 \times 10^{-7}$ Pa·s, measured at a shear rate of 1000 Hz and at a temperature of 150° F.

In some embodiments, the coating material contains a suitable pressure-sensitive hot melt. In certain embodiments, the pressure-sensitive hot melt has a melt temperature of at least 330° F. In some embodiments, the pressure-sensitive hot melt has a melt temperature of from 330° F. to 500° F.

Suitable pressure-sensitive hot melts include but are not limited to a wide variety of polymers and tackifier additives such that the adhesive can be applied to fasteners for use at high drive speeds, but that do not exhibit excess tack such that treated fasteners stick together when being packaged. Thus, the adhesive should be selected for suitable properties including the ability to flow under high shear rates, water resistance, heat resistance, percent elongation, and mechanical shear resistance. This may include but is not limited to hot melts made with polymers such as styrene block copolymers (SBC), styrene-butadiene-styrene (SBS), styrene-isoprene-styrene (SIS), styrene-ethylene/butylene-styrene (SEBS), or styrene-ethylene/propylene (SEP) type adhesives. These types of styrene block copolymer hot melts typically have high elongation and high heat resistance. Other hot melt base materials may include ethylene-vinyl acetate, ethylene-acrylate copolymers, polyolefins, polybutene-1, amorphous polyolefin, polyamides, polyesters, polyurethanes, including reactive or thermoplastic polyurethanes, polycaprolactone, polycarbonates, fluoropolymers, silicone rubbers, or thermoplastic elastomers. In certain embodiments, the pressure-sensitive hot melt includes a polymer and an additive selected from a group consisting of tackifying resins, waxes, plasticizers, UV stabilizers, and combinations thereof.

These materials have been found to achieve improved performance as compared to materials that have a higher viscosity at high shear rates. For example, materials that do not flow at high shear have a tendency to split, "ball-up", or "rub-off" and essentially be pushed out to the surface under the high friction driving force of the fastener. Advantageously, the disclosed coating materials have the ability to flow when being driven under high shear rates. When used with typical bugle head exterior drywall screws, which countersink and sit flush with the surface, the adhesive was observed to flow and coat the entire threaded area of the screw, up to the screw head countersink, creating an air and water barrier seal underneath the screw head and around the body as it penetrates. Furthermore, since the screws still sit flush with the surface, it does not interfere with monolithic surface treatments such as liquid treated joints or taped seams.

In certain embodiments, as shown in FIGS. 1 and 2, the coating material 104 is disposed from the second end 108 of the fastener 100 along a portion of the elongated body 102. For example, the coating material may be disposed from the second end along about ⅓ (as shown in FIG. 1) to about ⅔ (as shown in FIG. 2) of a length of the elongated body. In certain embodiments, the coating material 104 is present on the fastener body in an amount of from about 0.05 g to about 0.5 g, such as in an amount of from about 0.05 g to about 0.2 g. In certain embodiments, the fastener is a screw or bolt having threads extending from the second end of the elongated body, and the coating material is disposed such that it covers all or a portion of the threads.

In another aspect, as shown in FIGS. 3, 4, and 5A-5B, a fastener 200 includes an elongated fastener body 202 having a first end forming a head 204 of the fastener and an opposed second end 206 for driving into a surface 220, with an external surface of the fastener extending between the first end and the second end. An annulus 210 surrounds at least a portion of the external surface of the of the elongated fastener body at or adjacent the head 204 of the fastener 200.

In these embodiments, the annulus is formed of a suitable polymer that is relatively soft and has a low melt temperature, such that upon driving the fastener into a building panel or other surface, the annulus softens, spreads out, and compress into the space created by a harder bottom section (e.g., a spacer as described in more detail below) and/or around the head of the fastener between the fastener and the surface of the panel into which the fastener. Thus, in response to the heat generated along the fastener body when the fastener is driven into the surface of a building panel, a heat induced seal is formed by the annulus that creates an air and water barrier around the fastener head and body as it penetrates the building panel.

In certain embodiments, the annulus is formed of a polymer having a melt temperature of from about 130° F. to about 325° F. In some embodiments, the polymer annulus is formed of a polymer having a melt temperature of from about 130° F. to about 250° F. For example, the polymer annulus is formed of a polymer having a melt temperature of from about 140° F. to about 240° F. For example, the polymer annulus may be formed of ethylene-vinyl acetate, polycaprolactone, polyvinyl chloride, low density polyethylene, polypropylene, polystyrene, nylon, or a combination thereof. In other embodiments, the annulus may be formed of a low melt metal alloy.

It was determined that the primary heat generated by driving the fastener into a building panel using traditional means is in the range of about 160° F. Thus, in embodiments in which it is desired that the typical driving of the fastener generates the primary heat used to soften and melt the polymer annulus, the polymer annulus should be at least partially formed of a polymer having a melt temperature in this range or lower. For example, ethylene-vinyl acetates and/or polycaprolactones having a melt temperature as low as about 140° F. to about 150° F. may be used to form the polymer annulus.

If additional heat is added, such as by using alternate fastener driving means in which increased heat is generated or in which the annulus is subjected to additional heating prior to driving the annulus, then thermoplastics such as polyvinyl chloride, low density polyethylene, are polypropylene (e.g., having melt temperatures of about 220° F. to about 240° F.), and/or low melt metal alloys may be used to form the annulus.

Figure 3:
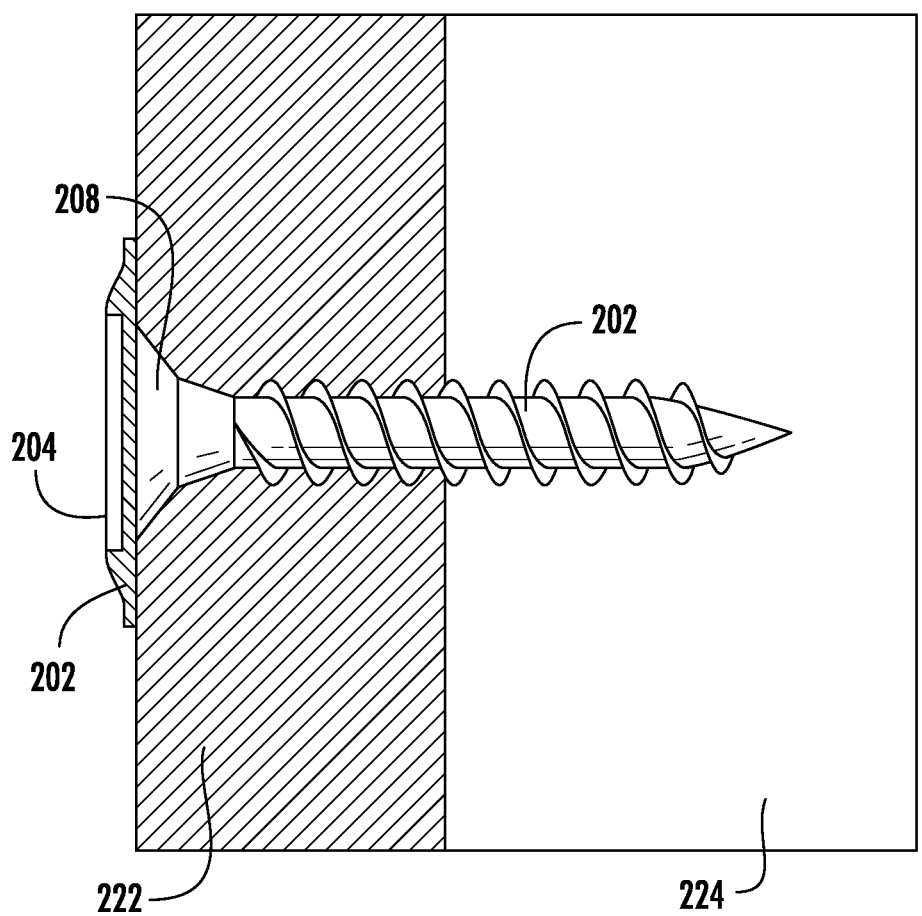
FIG. 3 is a cross-sectional view of a building system having a building panel, framing member, and one embodiment of a self-sealing fastener, in accordance with the present disclosure.

In certain embodiments, as shown in FIG. 3, the elongated fastener body 202 includes a tapered neck 208 adjacent the head 204 of the fastener, and a polymer annulus 202 is disposed at an interface the neck 208 and the head 204 of the fastener. For example, the polymer annulus may have a thickness and inner diameter such that it primarily surrounds the head of the fastener, primary surrounds the neck or shank of the fastener, or surrounds an interface of the neck and head of the fastener. In certain embodiments, the polymer annulus has an inner diameter such that the annulus fits snugly around the fastener body at or adjacent the head of the fastener. In some embodiments, the fastener may be manufactured to have the polymer annulus pre-applied thereto or the fastener and polymer annulus may be provided separately such that a user positions the polymer annulus on the fastener prior to use.

In some embodiments, the polymer annulus has an inner diameter of from about 0.1 inch to about 0.5 inch, such as from about 0.15 inch to about 0.3 inch. In some embodiments, the polymer annulus has an outer diameter at least as large as an outer diameter of the head of the fastener, such as from about 0.2 inch to about 1 inch, or from about 0.3 inch to about 0.5 inch. In some embodiments, the polymer annulus has a thickness of from about 0.004 inch to about 0.2 inch, such as from about 0.004 inch to about 0.044 inch.

In one embodiment, the fastener is a 1¼" bugle head screw and the polymer annulus has a thickness of from 0.004 to 0.044 inch and an inner 0.195 to 0.030 inch, so that it fits tightly and snugly against the bottom of the screw head. In some embodiments, the outer diameter of the polymer annulus is from about 0.350 to 1.0 inch and is larger than the screw head being sealed.

Figure 4:
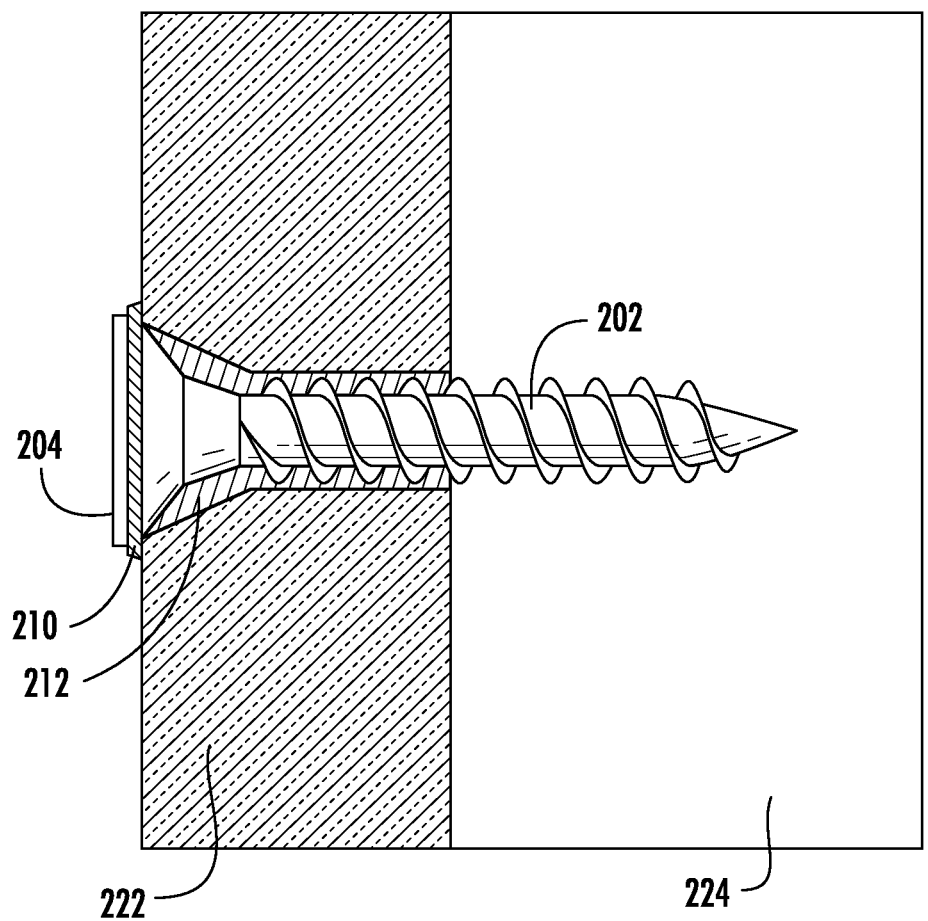
FIG. 4 is a cross-sectional view of a building system having a building panel, framing member, and one embodiment of a self-sealing fastener, in accordance with the present disclosure.
Figure 5A:
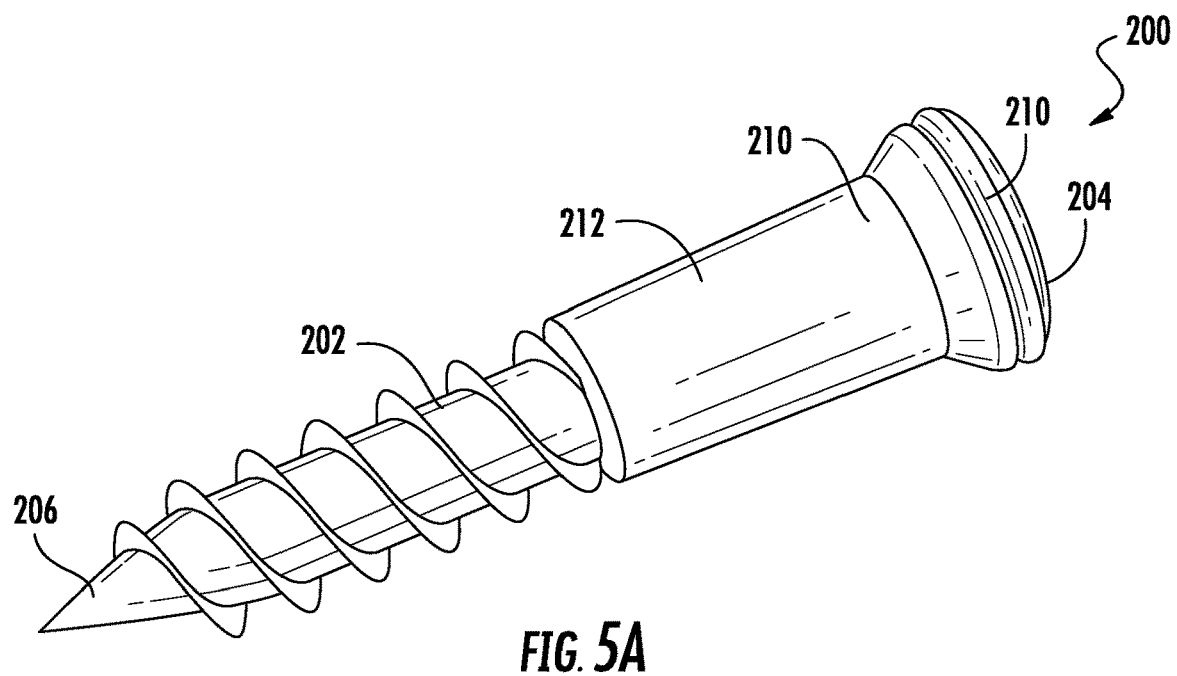
FIG. 5A is a perspective view of one embodiment of a self-sealing fastener, in accordance with the present disclosure.
Figure 5B:
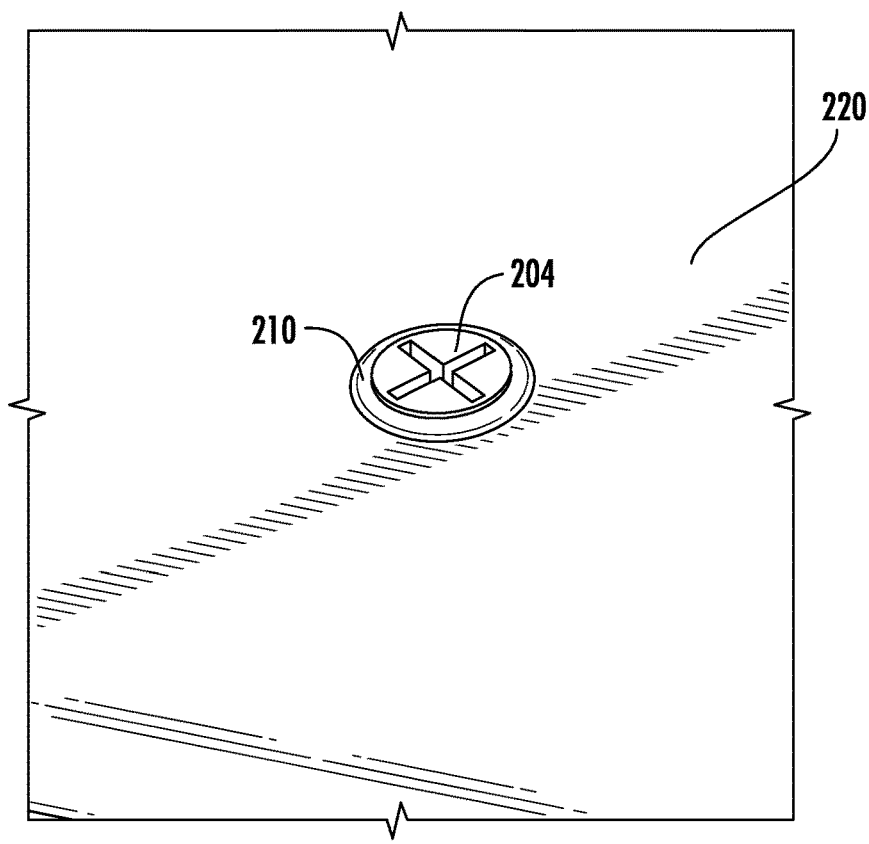
FIG. 5B is perspective view of the self-sealing fastener of FIG. 5A inserted into a building panel, in accordance with the present disclosure.

In certain embodiments, as shown in FIG. 4, the fastener having a polymer annulus 210 further includes a spacer 212 that has a flared body surrounding a central bore and a first end and a second opposed end, wherein the central bore is configured to receive a portion of the elongated fastener body 202 therethrough, such that the first end of the spacer is adjacent the polymer annulus 210. For example, the central bore of the spacer may be sized and shaped to follow the geometry of the elongated fastener body (e.g., the portion of the elongated body with any threads, and the neck or shank portion of the fastener body, which the spacer surrounds).

The spacer may have certain features as disclosed in U.S. Pat. No. 7,866,931, which is incorporated by reference herein. The spacer's design and materials allow for proper depth and countersinking, thereby preventing screws from being over driven when installing interior gypsum wallboard. However, the spacer alone does not provide a seal because the spacer's rigid body does not compress, causing leaking though the penetrated screws. This is especially true when screw heads move (in service or testing), such as caused by wall racking or transverse loads.

Thus, a fastener may include a spacer in combination with the polymer annulus described above. For example, the spacer may be made of a relatively hard material, such as a hard plastic (e.g., polycarbonate) or metal, to allow for penetration of the panel (e.g., gypsum panel) and so that it does not deform and maintains its shape while being driven through the panel. In certain embodiments, the spacer is formed from a material having a high finished Shore hardness of at least 85A, such as at least 100A. In some embodiments, the material has a Shore hardness of from about 85A to about 100D. In certain embodiments, the material has a high melt temperature, such as at least 550° F., so that is does not to deform under the heat generated when installing the fastener. In some embodiments, the material has melt temperature from about 550° F. to about 700° F.

The spacer may facilitate sealing of the polymer annulus, by providing a rigid surface against which the polymer annulus is able to soften, spread out, and compress into the space created by the spacer, around the screw head, and around the mat surface of the panel, when heated by driving the fastener.

In one embodiment, the fastener is a 1¼" bugle head screw and the polymer annulus has an inner diameter of about 0.265 inch, so it catches the top part of the bugle head screw where the taper becomes flat, an outer diameter of 0.320 and up to 0.500 inch or more, and a thickness of 0.004 to 0.20 inch, such as 0.008 inch or less, allowing enough material to compress and squeeze out when driving in the screw but not too much that the annulus will stick above the surface of the panel, crack the spacer, or raise on the edges.

For example, fasteners having a polymer annulus as described herein provide advantages over generic "gasket like" fasteners for roofing and lathing type applications, including the ability of the fastener head to sit flush with the surface of the sheathing panel, the prevention of overdriven fasteners, and allowing flashing/seaming to be installed easily over fastener heads and not interfere with sealing ability. Also, by sitting flush, these installed fasteners do not interfere with window, door, or finished cladding installation.

Methods of Installing Fasteners

Methods of installing the self-sealing fasteners described herein are also provided. These methods may involve any of the fastener embodiments and features thereof, described herein. In certain embodiments, a method of installing a fastener includes driving a fastener into a building panel, such that the coating material or polymer annulus forms a water-resistive seal between the building panel and the first end of the elongated body.

In certain embodiments, the first end of the elongated fastener body and/or the coating material or polymer annulus is substantially flush with a surface of the building panel upon installation. In certain embodiments, the building panel comprises a gypsum panel. In some embodiments, the water-resistive seal between the building panel and the first end of the elongated body passes a hydrostatic head test against water leakage, as measured by AATCC 127-2008, which is described in further detail below.

Building Systems

Figure 9:
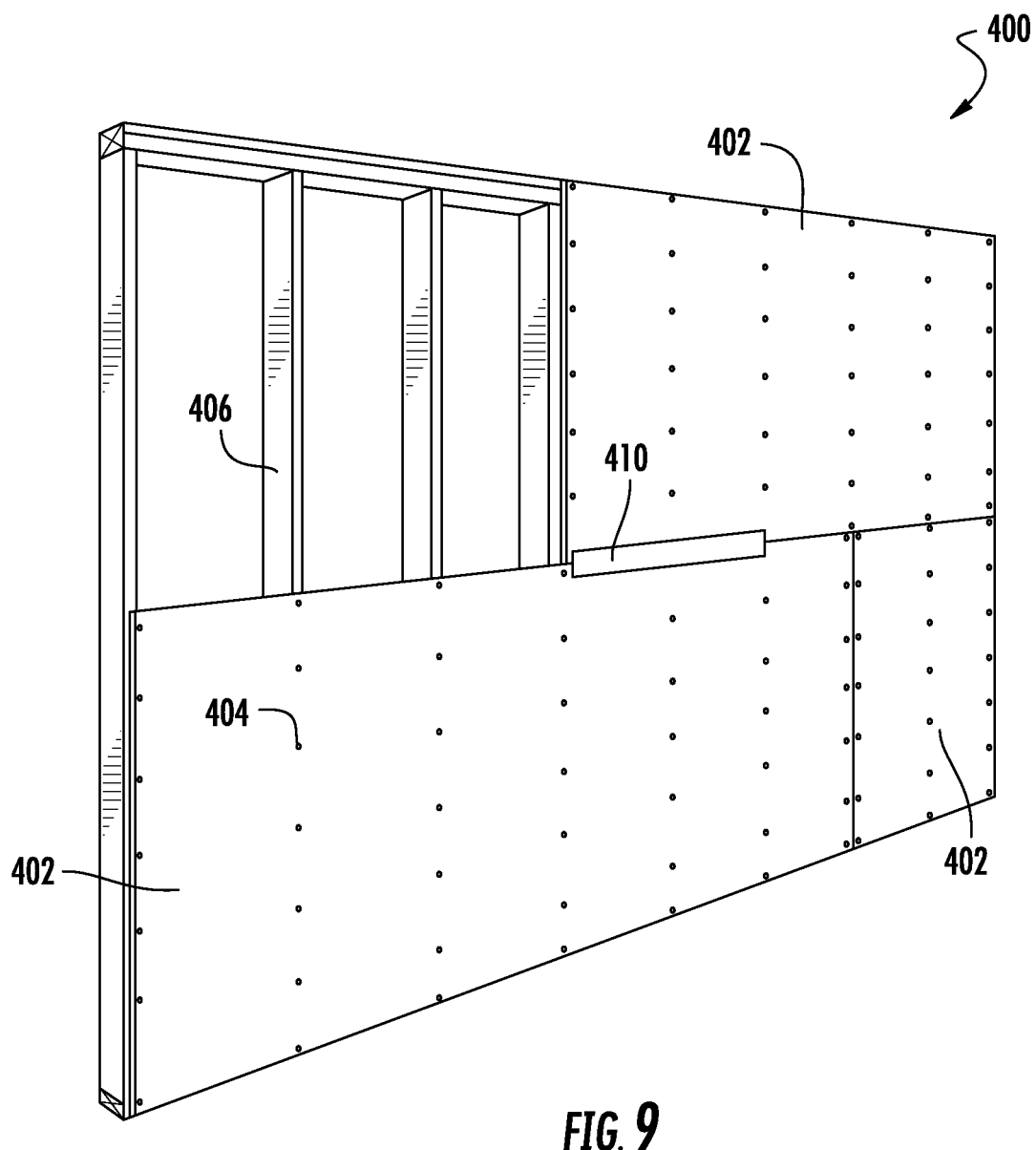
FIG. 9 is a perspective view of a building system having multiple building panels, framing members, and self-sealing fasteners, in accordance with the present disclosure.

Building systems including the self-sealing fasteners and/or panels described herein are also provided. In certain embodiments, as shown in FIG. 9, a building system 400 includes at least one building panel 402 and at least one fastener 404 driven through the building panel 402, such that the coating material or polymer annulus forms a water-resistive seal between the building panel 402 and the first end of the elongated body. The fastener type and design may be selected depending on the thickness of the building panel and the type of stud.

In certain embodiments, as described above, the building panels are gypsum sheathing panels having water-resistive air barrier properties, such as those described in U.S. application Ser. Nos. 15/014,793, 15/014,821, and 15/014,922, such that the system including the gypsum panels and the self-sealing fasteners has integrated water resistive and air barrier properties.

Figure 8:
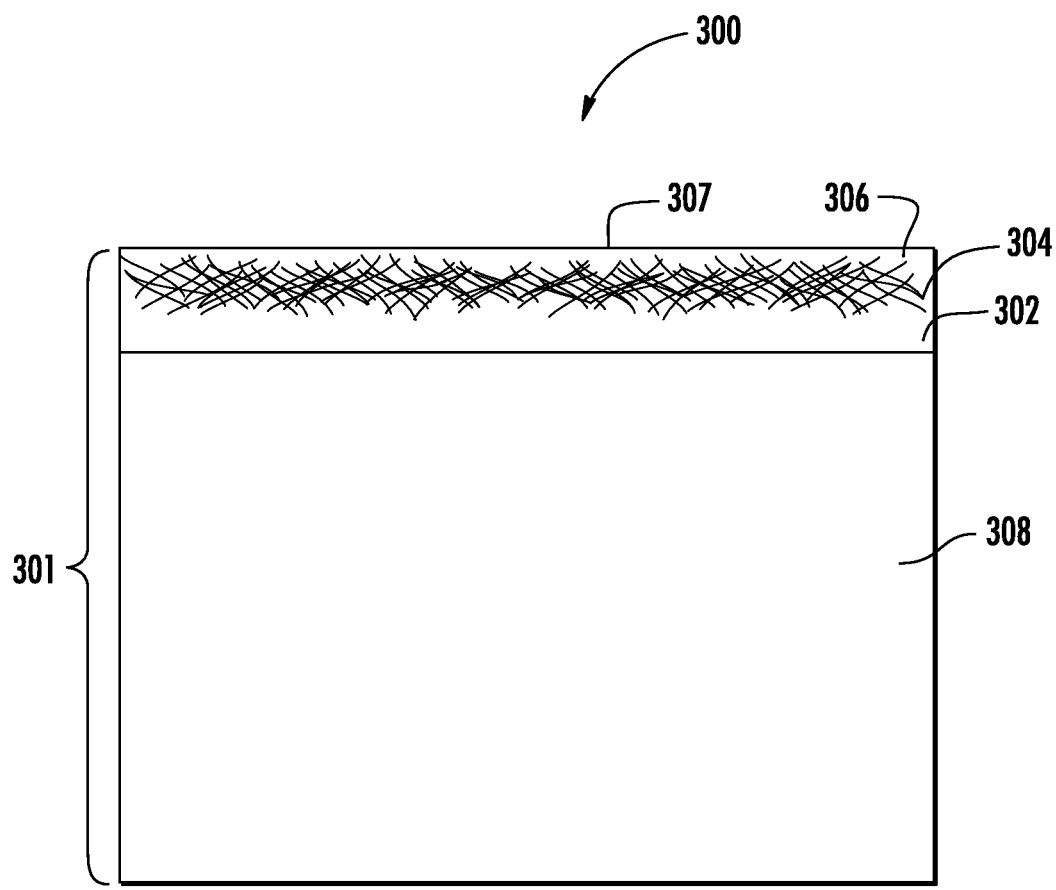
FIG. 8 is a cross-sectional view of a fiber mat faced gypsum panel having water-resistive air barrier properties, in accordance with the present disclosure.

In some embodiments, the building panel is a gypsum panel 300, as shown in FIG. 8, including gypsum core 301 having a first surface and a second opposed surface, and a first fiberglass mat 304 associated with the first surface of the gypsum core 301, such that gypsum of the gypsum core penetrates at least a portion of the first fiberglass mat 304. The various layers are illustrated as separate layers in the figures for ease of illustration; however, it should be understood that overlap of these materials may occur at their interfaces. In some embodiments, the gypsum of the gypsum core 301 penetrates a remaining portion of the first fiberglass mat 304 such that voids in the first fiberglass mat 304 are substantially eliminated and the water resistance of the panel 300 is further enhanced. For example, in one embodiment, the first fiberglass mat 304 has a continuous barrier coating 306 on a surface opposite the gypsum core 301, the continuous barrier coating 306 penetrating a portion of the first fiberglass mat 304, to define the remaining portion of the first fiberglass mat 304. That is, gypsum of the gypsum core 301 penetrates a remaining fibrous portion of the first fiberglass mat 304 such that voids in the first fiberglass mat 304 are substantially eliminated.

As used herein the phrase "such that voids in the fiberglass mat are substantially eliminated" and similar phrases, refer to the gypsum slurry, and thus the set gypsum, of the gypsum core filling all or nearly all of the interstitial volume of the fiberglass mat that is not filled by the coating material. In certain embodiments, the gypsum of the gypsum core fills at least 95 percent of the available interstitial volume of the coated fiberglass mat. In some embodiments, the gypsum core fills at least 98 percent of the available interstitial volume of the coated fiberglass mat. In further embodiments, the gypsum core fills at least 99 percent of the available interstitial volume of the coated fiberglass mat. Such panels, in which the gypsum penetrates the mat such that the voids in the mat are substantially eliminated, may be manufactured via a variety of methods, as discussed in more detail herein. For example, the gypsum that contacts the non-coated surface of the fiberglass mat may be hydrophobic or otherwise chemically modified for improved mat penetration, and/or mechanical means may be used to enhance penetration of the gypsum slurry into the mat.

In certain embodiments, a first surface 307 of the panel 300 formed by the first fiberglass mat 304 displays a water contact angle of at least 90 degrees, a Cobb surface water absorption measurement of 2 grams or less, or both. In some embodiments, the first surface 307 of the panel displays a Cobb surface water absorption measurement of 1 gram or less. Thus, the panels described herein may display superior surface water resistance or wettability properties. As used herein, the phrase "water contact angle" refers to the contact angle formed by a liquid in contact with the surface.

The continuous barrier coating 306 on the external surface of the fiberglass mat 304 may be any suitable coating known in the art. For example, the coating may include a binder material and, optionally, a filler. In certain embodiments, the coating contains filler in an amount from about 75 to about 97 weight percent. For example, the coating may contain filler in an amount from about 80 to about 95 weight percent. In one embodiment, the mat coating has a basis weight from about 3 pounds to about 9 pounds of solids per 100 square feet of the fiberglass mat. In one embodiment, the mat coating has a basis weight from about 2 pounds to about 8 pounds of solids per 100 square feet of the fiberglass mat. In certain embodiments, the binder is a polymer material. In certain embodiments, the coating on the first and/or second fiberglass mat is a latex acrylic polymer containing at least one inorganic filler.

In certain embodiments, the mat is a nonwoven fiberglass mat. For example, the glass fibers may have an average diameter of from about 10 to about 17 microns and an average length of from about ¼ inch to about 1 inch. For example, the glass fibers may have an average diameter of 13 microns (i.e., K fibers) and an average length of ¾ inch. In certain embodiments, the non-woven fiberglass mats have a basis weight of from about 1.5 pounds to about 3.5 pounds per 100 square feet of the mat. The mats may each have a thickness of from about 20 mils to about 35 mils. The fibers may be bonded together to form a unitary mat structure by a suitable adhesive. For example, the adhesive may be a urea-formaldehyde resin adhesive, optionally modified with a thermoplastic extender or cross-linker, such as an acrylic cross-linker, or an acrylate adhesive resin.

Moreover, while embodiments of the present disclosure are described generally with reference to fiberglass mats, it should be understood that other mat materials, including other fibrous mat materials, may also be used in the present panels. For example, paper mat facers known in the art may be used. In certain embodiments, the nonwoven fibrous mat is formed of fiber material that is capable of forming a strong bond with the material of the a building panel core through a mechanical-like interlocking between the interstices of the fibrous mat and portions of the core material. Examples of fiber materials for use in the nonwoven mats include mineral-type materials such as glass fibers, synthetic resin fibers, and mixtures or blends thereof. Both chopped strands and continuous strands may be used.

In certain embodiments, as shown in FIG. 8, the gypsum core 301 includes two or more gypsum layers 302, 308. For example, the gypsum core may include various gypsum layers having different compositions. In some embodiments, the first gypsum layer 302 that is in contact with the fiberglass mat 304 (i.e., the layer that forms an interface with the coating material and at least partially penetrates the remaining fibrous portion of the first fiberglass mat) is a slate coat layer. In some embodiments, the first gypsum layer 302 is present in an amount from about 5 percent to about 20 percent, by weight, of the gypsum core 301.

The layers of the gypsum core may be similar to gypsum cores used in other gypsum products, such as gypsum wallboard, dry wall, gypsum board, gypsum lath, and gypsum sheathing. For example, the gypsum core may be formed by mixing water with powdered anhydrous calcium sulfate or calcium sulfate hemihydrate, also known as calcined gypsum, to form an aqueous gypsum slurry, and thereafter allowing the slurry mixture to hydrate or set into calcium sulfate dihydrate, a relatively hard material. In certain embodiments, the gypsum core includes about 80 weight percent or above of set gypsum (i.e., fully hydrated calcium sulfate). For example, the gypsum core may include about 85 weight percent set gypsum. In some embodiments, the gypsum core includes about 95 weight percent set gypsum. The gypsum core may also include a variety of additives, such as accelerators, set retarders, foaming agents, and dispersing agents.

In certain embodiments, one or more layers of the gypsum core also include reinforcing fibers, such as chopped glass fibers. For example, the gypsum core, or any layer(s) thereof, may include up to about 0.6 pounds of reinforcing fibers per 100 square feet of panel. For example, the gypsum core, or a layer thereof, may include about 0.3 pounds of reinforcing fibers per 100 square feet of panel. The reinforcing fibers may have a diameter between about 10 and about 17 microns and have a length between about 6.35 and about 12.7 millimeters.

In certain embodiments, the panels have a thickness from about ¼ inch to about 1 inch. For example, the panels may have a thickness of from about ½ inch to about ⅝ inch.

By maximizing gypsum slurry penetration into the side of the fiberglass mat receiving gypsum, the movement of water under the mat coating within the glass mat of the finished panel when exposed to bulk water head pressures may be substantially and adequately reduced, without significantly altering the water vapor transmission rate (i.e., the ability to dry) of the finished panel. Thus, the gypsum panels disclosed herein may have one or more improved water-resistive barrier properties. Accordingly, when used in combination with the self-sealing fasteners described herein, the system of panels and fasteners provides a water-resistive air barrier, without the need for additional sealing materials being applied over the installed fasteners, significantly reducing installation labor and materials.

In certain embodiments, as shown in FIG. 9, a building system 400 further includes a framing member (e.g., wood or metal stud) 406, wherein the building panel 402 is attached to the framing member 406 by the at least one fastener 404, such that the at least one fastener 404 penetrates the building panel 402 and at least a portion of the framing member 406. For example, as shown in FIGS. 3 and 4, a building system includes a framing member (e.g., wood or metal stud) 224, wherein the building panel (e.g., ½ inch or ⅔ inch glass mat faced gypsum sheathing panel) 222 is attached to the framing member 224 by the at least one fastener, such that the at least one fastener penetrates the building panel 222 and at least a portion of the framing member 224. As shown, in certain embodiments, the first end (e.g., head) 204 of the elongated fastener body 202 is substantially flush with a surface of the building panel 222. As used herein, the term "substantially flush" refers to a difference in height between the fastener head or polymer annulus and the building panel surface of about 0.030 inches or less.

In certain embodiments, as shown in FIG. 4, the fastener further comprises a spacer 212 having a flared body surrounding a central bore and having a first end and a second opposed end, wherein the central bore receives a portion of the elongated fastener body therethrough, such that the first end of the spacer 212 is adjacent the polymer annulus 210, and the spacer has a length that is substantially similar to a thickness of the at least one building panel 222.

In one embodiment, as shown in FIG. 4, the dimensions of the spacer 212 are flush with the polymer annulus 210 (shown here around 0.338 inch for the outer diameter of the screw at its neck and the inner diameter of the spacer) and taper down to the threads (shown here around 0.249 inch for the outer diameter of the elongated body of the screw at the threads and the inner diameter of the spacer) of the elongated body 202 of the fastener. In some embodiments, the overall length of the spacer 212 is the fastener head 204 lip depth minus the caliper of the panel 222. So, for ⅝ inch sheathing panels used with a 1¼ inch bugle head screw, the total spacer length would be around 0.564 inch. For ½ inch sheathing panels used with a 1¼ inch bugle head screw, the total spacer length would be around 0.439 inch. In certain embodiments, the central bore of the spacer 212 follows the geometry of the fastener head 204, tapered shank, and threads within reasonable tolerances. The general profile of the spacer 212 may include a gradual taper from the screw threads to the top section adjacent the polymer annulus 210. This allows for easier insertion through the panel surface when installing fasteners with the space. The top section of the spacer 212 adjacent the polymer annulus 210 may have less taper or may be relatively straight.

In another aspect, as shown in FIG. 9, a building system 400 includes at least two building panels 402 that are gypsum panels, and a seaming component 410 configured to provide a seam at an interface between at least two of the gypsum panels 402. In certain embodiments, the seaming component is tape or a liquid-applied flashing material.

Self-Sealing Building Panels and Methods

Figure 10:
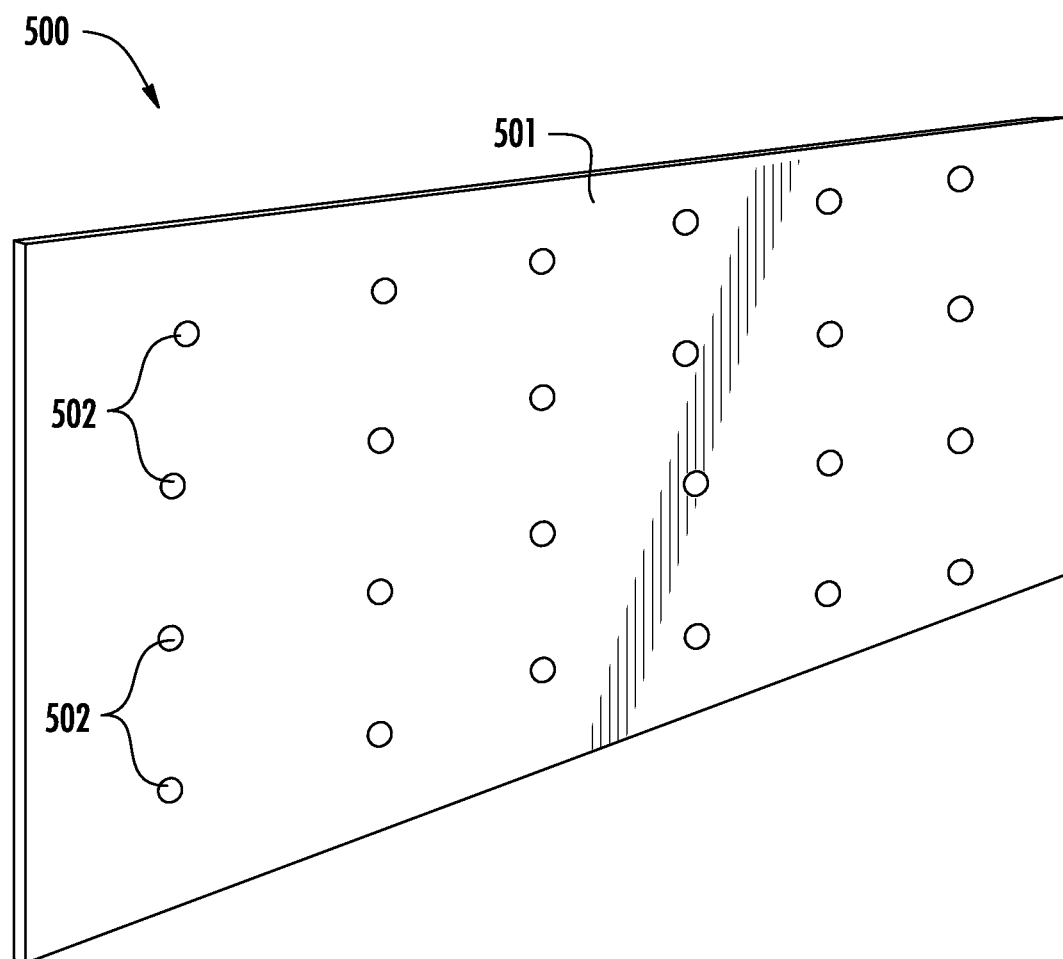
FIG. 10 is a perspective view of a building panel, in accordance with the present disclosure.

Building panels having a self-sealing feature are also provided. In certain embodiments, as shown in FIG. 10, a building panel 500 includes a panel core having a first surface and a second opposed surface, a mat associated with the first surface of the panel core, and forming an external surface 501 of the panel, and at least one dot of coating material 502 disposed on the external surface 501 of the panel 500. For example, a suitable building panel is shown in FIG. 8, which illustrates a gypsum panel 300, including gypsum core 301 having a first surface and a second opposed surface, and a first fiberglass mat 304 associated with the first surface of the gypsum core 301, such that gypsum of the gypsum core penetrates at least a portion of the first fiberglass mat 304.

As used herein, the term "dot" refers to an amount of the coating material applied at a region of the external surface of the panel and extending over only a relatively small portion of the external surface of the panel. The dots may be any suitable size, shape, and volume of adhesive, as discussed in more detail below.

In some embodiments, the building panel 500 includes a grid containing a plurality of the dots of coating material 502 disposed on the external surface 501 of the panel 500. For example, the plurality of dots may be equidistantly spaced from one another and provided in a series of rows and/or columns. In some embodiments, columns of dots are spaced in accordance with standard stud spacing parameters, such that the dots align with studs having the standard spacing. Providing a pre-spaced fastening grid that indicates where the fasteners should be driven through the panel advantageously saves time, as the installer would not need to run chalk lines on the panels, while also providing the fastener sealing property, which further saves time and reduces labor and materials. In some embodiments, each dot contains the coating material in an amount of from about 0.05 g to about 0.5 g, such as from about 0.05 g to about 0.2 g.

Advantageously, the coating material used to form the fastener grid on the surface of the sheathing may have a very low viscosity at high shear rates, such that when fasteners are driven by a screw gun (which operate at high revolutions, of approximately 4000 rpm) or similar tool, the coating material from the panel covers the fastener and has a tendency to flow and coat the entire shank area up to the countersink. In this way, the fasteners sit flush with the surface and do not interfere with monolithic liquid joint or tape treatments or exterior cladding.

In some embodiments, the coating material displays a viscosity of less than 1 Pa·s, measured at a shear rate of 1000 Hz and at a temperature of 150° F. In some embodiments, the coating material displays a viscosity of less than $1 \times 10^{-3}$ Pa·s, measured at a shear rate of 1000 Hz and at a temperature of 150° F. In some embodiments, the coating material displays a viscosity of less than $2 \times 10^{-5}$ Pa·s, measured at a shear rate of 1000 Hz and at a temperature of 150° F. In some embodiments, the coating material may display a viscosity of from about 1 Pa·s to about $1 \times 10^{-7}$ Pa·s, measured at a shear rate of 1000 Hz and at a temperature of 150° F.

In some embodiments, the coating material contains a suitable pressure-sensitive hot melt. In certain embodiments, the pressure-sensitive hot melt has a melt temperature of at least 330° F. In some embodiments, the pressure-sensitive hot melt has a melt temperature of from 330° F. to 500° F.

For example, the pressure-sensitive hot melt may be a polymer selected from a group consisting of styrene block copolymers, styrene-butadiene-styrene, styrene-isoprene-styrene, styrene-ethylene/butylene-styrene, styrene-ethylene/propylene adhesives, ethylene-vinyl acetate, ethylene-acrylate copolymers, polyolefins, polybutene-1, amorphous polyolefin, polyamides, polyesters, polyurethanes, including reactive or thermoplastic polyurethanes, polycaprolactone, polycarbonates, fluoropolymers, silicone rubbers, and thermoplastic elastomers. In some embodiments, the pressure-sensitive hot melt includes a polymer and an additive selected from a group consisting of tackifying resins, waxes, plasticizers, UV stabilizers, and combinations thereof.

The dots may be applied during sheathing production or glass mat web production by an automatic pneumatic gun, automatic electric gun, jetting, contact wheel, or any other application method known to the industry. The tack or surface stickiness of the coating material once applied should be selected to be low enough such that it will not block or stick panels together. Polymer choice, tackifier resins, co-polymers, degree of crystallinity, additives, etc. can all affect surface tack.

In certain embodiments, methods of installing fasteners include driving a suitable fastener (which does not need to have any coating material or polymer annulus) through the at least one dot of coating material and into the building panel, such that the coating material forms a water-resistive seal between the fastener and the building panel. As discussed above, in some embodiments, the first end of the elongated fastener body is substantially flush with the external surface of the building panel upon installation.

In certain embodiments, a building system includes at least one building panel having a coating material dot and at least one fastener driven through the at least one dot of coating material and into the building panel, such that the coating material forms a water-resistive seal between the fastener and the building panel. In some embodiments, the system also includes a framing member, wherein the at least one building panel is attached to the framing member by the at least one fastener, wherein the at least one fastener penetrates the building panel and at least a portion of the framing member. In certain embodiments, the system also includes a seaming component (e.g., tape or a liquid-applied flashing material) configured to provide a seam at an interface between at least two of the gypsum panels.

Water-Resistive Air Barrier Systems

The presently disclosed building systems (e.g., systems of panels with self-sealing dots in combination with traditional fasteners or systems of panels with self-sealing fasteners) advantageously provide an improved water-resistive air barrier system without requiring one to spot the installed fasteners heads with a liquid or other sealant.

As will be described in further detail below, in certain embodiments, in the absence of liquid or other sealant applied to the at least one fastener, the building systems described herein (i) pass a hydrostatic head test against water leakage, as measured by AATCC 127-2008, (ii) display no water leaks when measured according to ICC Evaluation Service Acceptance Criteria 212, Section 4, after being subjected to the test methods of ASTM E2357 procedure A, ASTM E72, and restrained environmental conditioning, and/or (iii) display no water leaks when measured according to ASTM E331 wall assembly test at an air pressure of 2.86 psf. ASTM E 331 is an 8'×8' wall assembly test where the wall is mounted in the front of a chamber and the back of the wall is sealed in the chamber. Water is sprayed on the outside face of the wall over the sheathing while a vacuum is pulled on the back of the assembly. Failure would be leaks to the back of the assembly. The test can be run from 15-minutes up to 4-hours with negative air pressures from 1.64 psf to 6.24 psf or more with water spray of 8 gallons per minute. Water leakage through fasteners may also be gauged by a standing water head directly over the fasteners for a standard length of time. The water head may by ½ inch up to 22-inches for a length of time of 2 hours and up to 24 hours. Failure would be leakage of water though the screw heads to the underside of the sheathing. Gravimetric measurements of weight change can be made, as described in the Examples below.

In certain embodiments, a seaming component comprising tape or a bonding material is applied to treat areas of potential water and air intrusion, such as seams, door/window openings, roof/wall interfaces, and wall/foundation interfaces, but not to the fastener penetrations. For example, the seaming component may be a tape including solvent acrylic adhesives, a tape having a polyethylene top layer with butyl rubber adhesive, a tape having an aluminum foil top layer with butyl rubber adhesive, a tape having an EPDM top layer with butyl rubber adhesive, a tape having a polyethylene top layer with rubberized asphalt adhesive, or a tape having an aluminum foil top layer with rubberized asphalt adhesive. For example, the seaming component may be a bonding material such as synthetic stucco plasters, cement plasters, synthetic acrylics, sand filled acrylics, solvent based acrylics, solvent based butyls, polysulfides, polyurethanes, silicones, silyl modified polymers, water-based latexes, EVA latexes, or acrylic latexes. As such, the building sheathing panels, when used in combination with a suitable seaming component at potential intrusion areas other than the fastener penetrations, create an effective water-resistive and/or air barrier envelope.

Such building systems may advantageously pass any or all ICC-ES tests required for water resistant and air barrier system performance. For example, the sheathing systems may pass Sections 4.1, 4.2, 4.3, 4.4, 4.7, and/or 4.8 of the ICC-ES Acceptance Criteria for water-resistive coatings used as water-resistive barriers over exterior sheathing (ICC Evaluation Service Acceptance Criteria 212), dated February 2015. For example, the systems may pass Section 4.5 of the ICC-ES Acceptance Criteria for water-resistive membranes factory bonded to wood-based structural sheathing, used as water-resistive barriers (ICC Evaluation Service Acceptance Criteria 310), dated May 2008, and revised June 2013.

In certain embodiments, the building system including at least two gypsum panels, fasteners, and a seaming component displays no water leaks when measured according ICC Evaluation Service Acceptance Criteria 212, section 4. This test uses an 8' by 8' wall assembly built with multiple gypsum panels and having two vertical joint treatments and one horizontal joint treatment with seaming component(s) (as described in more detail herein) and flashing treatment with seaming component(s). The wall is subjected to 10 positive transverse load cycles of ASTM E2357 (procedure A), to racking loads of ASTM E72 to obtain a net deflection of ⅛ inch with hold-downs, and then to restrained environmental conditioning cycles as described in AC 212 section 4.7.3 for two weeks. Thus, in some embodiments, the building sheathing system displays no water leaks when measured according to ICC Evaluation Service Acceptance Criteria 212, Section 4, after being subjected to the test methods of ASTM E2357 procedure A, ASTM E72, and restrained environmental conditioning. The cycled wall is then tested in ASTM E 331 water penetration with a water spray of at least 8 gallons of water per minute and air pressure differential of 2.86 psf, and resulting in no leaks within the field of the panel or cracking of sheathing or seaming components.

Thus, in some embodiments, the building system displays no water leaks when measured according to ASTM E331 wall assembly test at an air pressure of 2.86 psf and/or at an air pressure of 8.58 psf. The ASTM E331 test may be a water spray after a structural test and/or a test including the building transitions, openings, and penetrations. In addition to ASTM E 331, other suitable tests may be substituted, such as tests using chambers that spray or flood the exposed side of the wall or are rotated to receive bulk water and create a negative air pressure differential on the inside cavity in order to expose leaks. This may include but is not limited to ASTM E547, ASTM D5957, AAMA 501, or field testing apparatus such as ASTM E1105. Thus, the building sheathing systems described herein may pass any combination of the foregoing tests.

In certain embodiments, the building system displays an air penetration resistance of 0.02 $L/sm^2$ at 75 Pa, or less, when measured according to ASTM E2178. In certain embodiments, the sheathing system displays an air penetration resistance of 0.02 $L/sm^2$ at 300 Pa, or less, when measured according to ASTM E2178.

In certain embodiments, the building system displays an exfiltration and infiltration air leakage rate of less than 0.04 $cfm/ft^2$ at 1.57 $lbs/ft^2$ (75 Pa), when measured according to the ASTM E2357 air barrier assembly test for both opaque walls and walls with penetration, when 8' by 8' walls are prepared using seaming components to seal joints, window openings, duct penetrations, pipe penetrations, external junction boxes, and masonry ties. In some embodiments, the ASTM E2357 wall assemblies, after being is exposed to Q10>0.20 kPa pressure design value wind loads for sustained, cyclic, and gust loads display an air leakage infiltration and exfiltration rate of less than 0.04 $cfm/ft^2$ at 6.27 $lbs/ft^2$ (300 Pa). In certain embodiments, the building sheathing system displays an exfiltration and infiltration air leakage rate of less than 0.02 $cfm/ft^2$ at 1.57 $lbs/ft^2$ (75 Pa), when measured according to the ASTM E2357 air barrier assembly test for both opaque walls and walls with penetration. In addition to ASTM E 2357, other tests may be used to quantify air leakage in this range, including ASTM E283, ASTM E2319, ASTM E1424, ASTM E283, ASTM E1424, or similar test methods. Also, related field testing to test pressure differentials, in this range, such as ASTM E783 or related blower door apparatus testing may also be used. Thus, the building systems described herein may pass any combination of the foregoing tests.

In some embodiments, the system passes a hydrostatic head test against water leakage, as measured by AATCC 127-2008. In certain embodiments, the building sheathing system passes AATCC hydrostatic head test method 127-2008 for a 22-inch head of water (114 psf water pressure) directly over an interface of at least two gypsum panels and the seaming component, with no leaks after 5 hours. In addition to hydrostatic head pressure, other similar tests can be used to assess bulk water resistance in the range of 0.32 inches water (1.67 psf) to 44 inches of water head pressure (228 psf). This may include but is not limited to other water head tests (such as ASTM E2140), water ponding test, cobb tests (such as ASTM C473, ASTM D 3285, ASTM D 5795, ASTM D7433, ASTM D7281), or a chambered test aided by vacuum or negative pressure differentials. Thus, the building systems described herein may pass any combination of the foregoing tests.

In certain embodiments, the system passes AC310-2008, which tests water-resistive membranes & barriers. In some embodiments, the system passes AAMA 714 standard for liquid-applied flashing.

In certain embodiments, the system has a water vapor permeance of at least 10 (inch pound units per ASTM E96 wet cup method). In certain embodiments, the system has a water vapor permeance of at least 20 (inch pound units per ASTM E96 wet cup method).

Embodiments of the self-sealing fasteners and building panels disclosed herein were constructed and tested, as described below.

EXAMPLE 1

The bugle head screws (1⅝" Grip Rite Prime guard exterior bugle head screws) pictured in FIGS. 1 and 2 were treated with various coating materials (e.g., hot melts). Four hot melts were chosen from pre-screening exercises including Swift® 81866, which is a Styrene-Isoprene-Styrene (SIS) Block co-polymer (available from H.B. Fuller), Swift® melt 82674 (available from H.B. Fuller), HL-6281-XZP (available from H.B. Fuller), and HL-1719-X ZP (available from H.B. Fuller). The hot melts were pre-screened and chosen based on relative properties, including elongation at room temperature, static shear strength, tackiness, and viscosities at melt temperature. Also, key determinations were made from observations of how the adhesive remained on the screw treads after being driven into the sheathing.

The hot melts were applied to the screws with a Nordson Mini Squirt hot melt applicator at 370° F. onto a tongue depressor in a single hot melt line. The bugle head screws were then rolled over the line in a single pass picking up hot melt on the screw threads. The lower third of the screw threads were treated, approximately ½-inch at the bottom of the screw near the point, as shown in FIG. 1, or about two thirds of the screws were treated which was approximately 1-inch, as shown in FIG. 1. The adhesive and amount applied for eight test conditions are shown in Table 1 below.

TABLE 1

Adhesive Parameters for Example 1
Experiment 1: Screw Treatments

| Conditon | adhesive type | avg grams of adhesive | screw treatment coverage |
| --- | --- | --- | --- |
| A | 81866 | 0.093 | ½" on threads |
| B | — | — | no screw - control |
| C | 25:75 blend 81866 and 82674 | 0.097 | ½" on threads |
| D | 82674 | 0.117 | ½" on threads |
| E | HL-1719 | 0.140 | 1" on threads |
| F | — | — | untreated screw - control |
| G | HL-1719 | 0.107 | ½" on threads |
| H | HL-6282 | 0.103 | ½" on threads |

Figure 6:
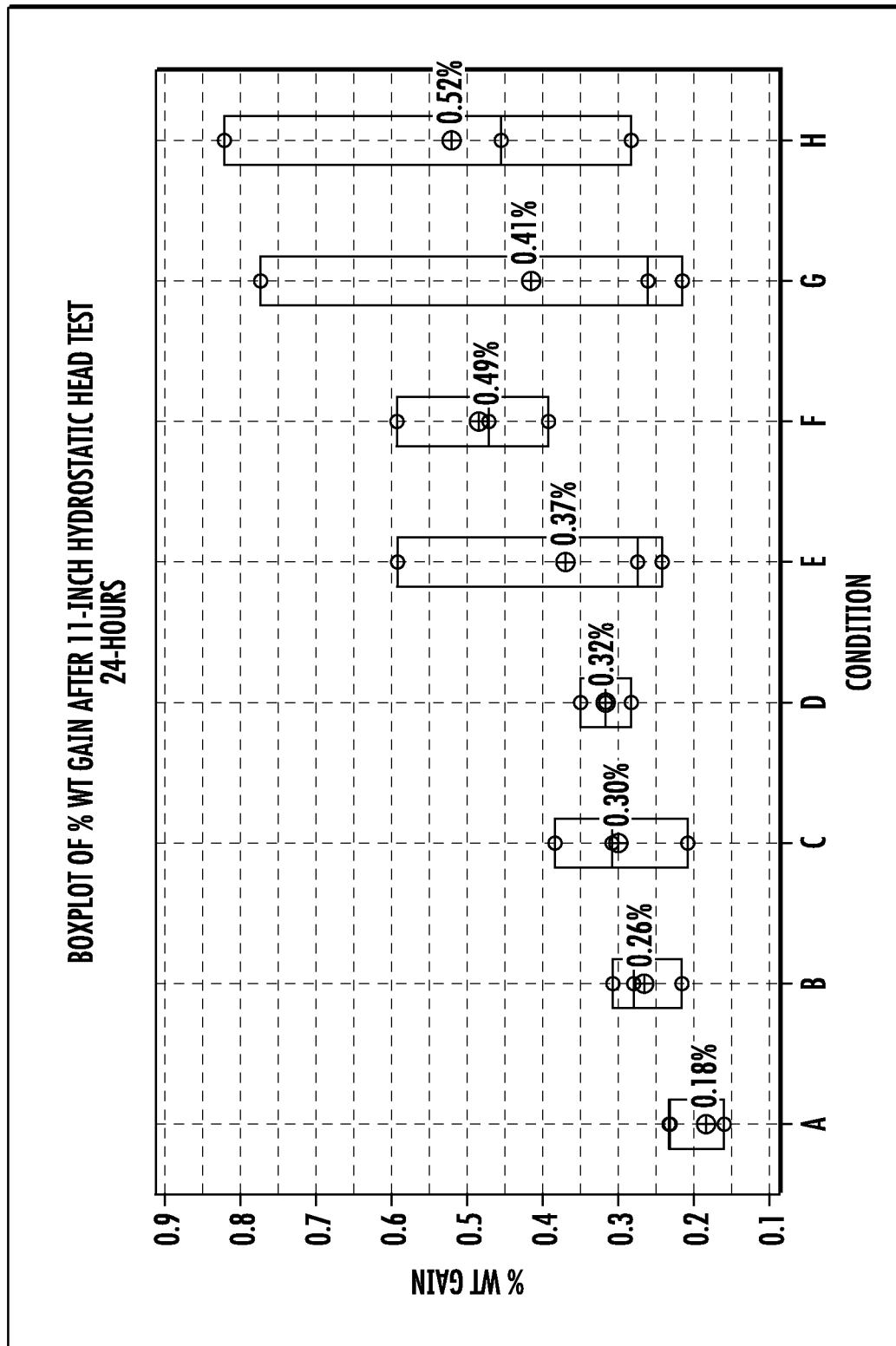
FIG. 6 is a graph showing the results of the hydrostatic head tests of Example 1.

Three test specimens were prepared for each of the test conditions, by driving the screws through ⅝" DensElement™ sheathing (available from Georgia-Pacific) into an underlying yellow pine 2"×4" wood stud. Two controls were made, condition B with no screw and condition F with untreated bugle head screws. A Dewalt DW252 6 amp electric drywall screwdriver with depth sensitive nose piece was used and the depth was pre-set, so that all the screws heads were driven flush with the surface. A 4.5-inch inner diameter PVC pipe was then glued directly over the face with silicone and centered over the driven screws. Specimens were conditioned 24-hours at 70° F. and 50 percent relative humidity to constant weight. The tubes were then filled with 11 inches of water and sat filled for 24 hours. After this time, the water was emptied, specimens were blotted dry, and re-weighed. The percent weight gain was calculated, and these results are shown in FIG. 6.

As can be seen from the graph, the screws treated with Swift® 81866 (A) and a blend containing 81866 and another hot melt (C) had the lowest overall percent weight gain. These two conditions were not statistically different in percent weight gain from control specimens containing no screws (B). It was also observed when removing screws, that the screw hole was not damp.

Good results were also obtained with hot melt 82674 (D), although a little higher weight gain, it did not show any observations of dampness in the screw hole. All 3 sets containing 81866, 81866 blend, and 82673 were statistically better than untreated bugle head screws (F). The untreated screws also showed dampness when the screws were removed.

Thus, it was determined that the preferred coating material used to coat the screw threads of this embodiment is a material with high elongation and very low viscosity at high shear rates, for example Swift® 81866 or Swift® melt 82674, as explained above. To quantify the viscosity at high shear rates a parallel plate rheometer was used. Two flat aluminum plates were glued together by heating to 120° C. (hot melt application temperature). The temperature was then reduced to 65° C. (150° F.). This temperature was chosen to simulate the relative frictional temperature experienced by a driving a screw. The plates were then rotated in opposite directions at very high and very low rates. Testing indicated that at very high shear rates (1000 Hz or 60,000 rpm) the preferred hot melt (Swift® 81866 and Swift® melt 82674) were found to have extremely low infinite viscosities of 1.83 E-05 to 3.50 E-06 Pa·s.

Similarly, this mechanism was also demonstrated with the hot melt coated screw threads that had a tendency to flow at high shear rates. Typical hot melts tested had viscosities of >7,000 Pa·s at these high shear rates, if they could be measured at all. There was also no difference in the viscosity at low shear rates from standard adhesive only at high shear rates.

Furthermore, the preferred hot melts were found to not melt from the frictional heat created by driving the screws, which application temperature/melt point is >330° F. This is preferred as gypsum sheathing is typically used in applications where fire resistance is desired.

EXAMPLE 2

Spacers as described above and as shown in FIGS. 5A-5B were treated with the hotmelt Swift 81866 around the countersink neck. The spacer was mounted on a bugle head screw, as shown for Condition "J" in Table 2.

TABLE 2

Experimental Parameters for Example 2
Experiment 2: Screw Treatments

| Condition | adhesive type | avg grams of adhesive | screw treatment area |
| --- | --- | --- | --- |
| I | — | — | Control - DensElement ™ no screw |
| J | 81866 | ~0.05 | Bugle Head, spacer w/ 81866 HM |
| K | — | — | Spacer only |
| E | — | — | Control - Ext Bugle head |

Figure 7:
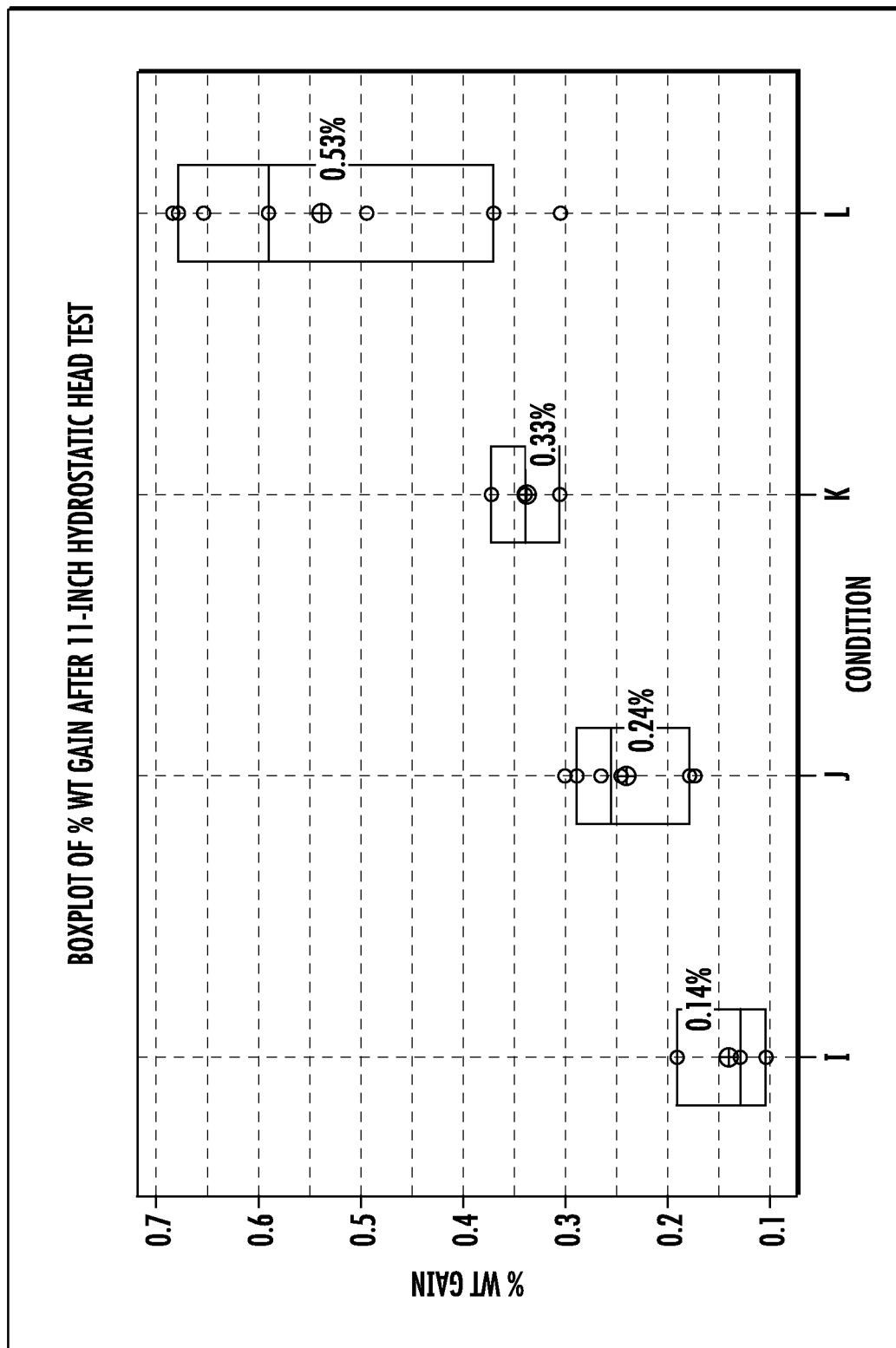
FIG. 7 is a graph showing the results of the hydrostatic head tests of Example 2.

Three test specimens were prepared for each of the test conditions, by driving the screws through ⅝" DensElement™ sheathing into an underlying yellow pine 2"×4" wood stud. A 4.5-inch inner diameter PVC pipe was then glued directly over the face with silicone and centered over the driven screws. Specimens were conditioned 24-hours at 70° F. and 50 percent relative humidity to constant weight. The tubes were then filled with 11 inches of water and sat filled for 24 hours. After this time, the water was emptied, specimens were blotted dry, and re-weighed. The percent weight gain was calculated, and these results are shown in FIG. 7.

As shown in the graph, the spacer treated with 81866 hot melt treatment around the countersink neck and showed results lower than penetrated screws alone and close to controls with no screws. It is believed that the results were higher than in Example 1 because the threads were not also treated.

EXAMPLE 3

A time motion study was conducted to determine the time savings associated with the disclosed self-sealing fasteners used in combination with sheathing barrier system versus commercially available alternatives. Specifically, a three-story commercial building having a height of 28 feet, a total wall length of 88 feet, and a total of 2,464 gross square feet of sheathed exterior wall area was constructed. The building included 12 window openings and two door openings as well as a combination of outside and inside corners, to replicate a realistic commercial construction setting. An experienced water and air barrier installation crew installed four distinct barrier systems, including window and door flashing suitable for non-flanged commercial windows and doors, on one half of the building (i.e., approximately 1,126 net square feet of sheathed area with one door and six window openings), according to the manufacturers' installation guidelines for non-flanged windows, including coating the inside door and window openings with a fluid-applied sealant or flashing tape.

The first system included building wrap fastened with a pneumatic cap stapler to the sheathing panels. All wrap seams were overlapped and sealing with 2.5 inch tape. 6 inch self-adhesive flashing was applied to all window and door openings. The total installation time was 8 hours and 31 minutes. The second system included fluid sealant applied via a fluid gun onto fastener heads and panel seams of the sheathing system, fluid sealant applied via a fluid gun to fully flash one door and six window openings, and fluid sealant applied by roller onto the entire exterior surface of the sheathing panels. The total installation time was 10 hours and 41 minutes.

The third and fourth systems included water-resistive air barrier gypsum sheathing panels. In the third system, 4 inch self-adhesive flashing was applied to the sheathing seams and corners, fluid sealant was applied to fastener heads, and 6 inch self-adhesive flashing was applied to all wind and door openings. The total installation time was 6 hours and 22 minutes. In the fourth system, fluid sealant was applied to all fastener heads, seams, and door/window openings. The total installation time was 6 hours and 26 minutes. Thus, installation of the sheathing systems including the water-resistive air barrier sheathing panels disclosed herein was accomplished in significantly less labor time as compared to known commercial building wrap and fluid sealant systems. However, it was observed that in the third and fourth systems, the process of applying the fluid sealant to the fastener heads took at least 60 minutes of the total installation time, accounting for greater than 15 percent of the total installation time.

The fasteners and panels of the present disclosure wholly eliminate the need for fluid or other fastener sealants and thereby further reduce the installation time of sheathing systems including water-resistive air barrier sheathing panels. For example, the self-sealing fasteners and panels disclosed herein may provide a reduction in installation time of greater than 15 percent as compared to traditional fasteners spotted with fluid sealant. Advantageously, these fasteners and building panels eliminate the need to spot fasteners with a liquid sealant or other external sealing means and reduce the possibility of liquid penetrating into cladding systems (i.e., building systems) formed with these fasteners and building panels. Thus, these self-sealing fasteners and building panels allow for faster installation of building systems and material savings over traditional water and air barrier systems.

While the disclosure has been described with reference to a number of embodiments, it will be understood by those skilled in the art that the invention is not limited to such disclosed embodiments. Rather, the invention can be modified to incorporate any number of variations, alterations, substitutions, or equivalent arrangements not described herein, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A fastener, comprising:
an elongated fastener body having a first end and an opposed second end, with an external surface having an axial circumference and a length, the length extending between the first end and the second end; and
a single coating material disposed around an entirety of the axial circumference and along no more than ⅔ of the length of the external surface beginning adjacent the second end such that a reminder of the length of the external surface is uncoated,
wherein the coating material displays a viscosity of less than 1 Pa·s, measured at a shear rate of 1000 Hz and at a temperature of 150° F.

2. The fastener of claim 1, wherein the coating material displays a viscosity of less than $1 \times 10^{-3}$ Pa·s, measured at a shear rate of 1000 Hz and at a temperature of 150° F.

3. The fastener of claim 1, wherein the coating material comprises a pressure-sensitive hot melt.

4. The fastener of claim 3, wherein the pressure-sensitive hot melt comprises a polymer selected from a group consisting of styrene block copolymers, styrene-butadiene-styrene, styrene-isoprene-styrene, styrene-ethylene/butylene-styrene, styrene-ethylene/propylene adhesives, ethylene-vinyl acetate, ethylene-acrylate copolymers, polyolefins, polybutene-1, amorphous polyolefin, polyamides, polyesters, polyurethanes, including reactive or thermoplastic polyurethanes, polycaprolactone, polycarbonates, fluoropolymers, silicone rubbers, and thermoplastic elastomers.

5. The fastener of claim 3, wherein the pressure-sensitive hot melt comprises a polymer and an additive selected from a group consisting of tackifying resins, waxes, plasticizers, UV stabilizers, and combinations thereof.

6. The fastener of claim 3, wherein the pressure-sensitive hot melt has a melt temperature of at least 330° F.

7. The fastener of claim 1, wherein the fastener is selecting from a group consisting of a pin, nail, screw, rivet, and bolt.

8. The fastener of claim 1, wherein:
wherein the fastener is a screw having a head at the first end of the elongated body and threads extending at least partially between the first end and the second end of the elongated body, and
the fastener has a length extending from the first end to the second end and the coating material is disposed from the second end along about ⅓ to about ⅔ of the length of the elongated body.

9. The fastener of claim 8, wherein the screw is selected from a group consisting of a bugle head screw, a wafer head screw, a drill point screw, a sharp point screw, and a self-tapping screw.

10. The fastener of claim 1, wherein the coating material is present on the fastener body in an amount of from about 0.05 g to about 0.5 g.

11. A fastener, comprising:
an elongated fastener body having a first end forming a head of the fastener and an opposed second end for driving into a surface, with an external surface extending between the first end and the second end; and
a polymer annulus surrounding at least a portion of the external surface of the elongated fastener body at and adjacent the head of the fastener,
wherein:
a portion of a top surface of the polymer annulus is flush with and surrounding respective top, side, and bottom surfaces of the head of the fastener; and
the polymer annulus is formed of a polymer having a melt temperature of from about 130° F. to about 325° F.

12. The fastener of claim 11, wherein the elongated fastener body further comprises a tapered neck adjacent the head of the fastener, and the polymer annulus is disposed at an interface of the neck and the head of the fastener.

13. The fastener of claim 11, wherein the polymer is selected from a group consisting of ethylene-vinyl acetate, polycaprolactone, low density polyethylene, polypropylene, and polystyrene.

14. The fastener of claim 11, wherein the polymer annulus has an inner diameter of from about 0.1 inch to about 0.5 inch.

15. The fastener of claim 11, wherein the polymer annulus has an outer diameter at least as large as an outer diameter of the head of the fastener.

16. The fastener of claim 11, wherein the polymer annulus has an outer diameter of from about 0.2 inch to about 1 inch.

17. The fastener of claim 11, wherein the polymer annulus has a thickness of from about 0.004 inch to about 0.2 inch.

18. The fastener of claim 11, further comprising a spacer comprising a flared body surrounding a central bore and having a first end and a second opposed end, wherein the central bore is configured to receive a portion of the elongated fastener body therethrough, such that the first end of the spacer is adjacent the polymer annulus, and wherein the central bore of the spacer is sized and shaped to follow the geometry of the elongated fastener body.

19. The fastener of claim 18, wherein the spacer comprises a material having a Shore hardness of at least 85A.

20. The fastener of claim 18, wherein the spacer comprises a material having a melt temperature of at least 550° F.

* * * * *